3,438,791
REFRIGERATED DOUGH PRODUCT
Samuel A. Matz, Milwaukee, Wis., assignor to The Borden Company, New York, N.Y., a corporation of New Jersey
No Drawing. Filed July 29, 1965, Ser. No. 475,871
Int. Cl. A21d 8/02; A23l 3/36
U.S. Cl. 99—192                4 Claims

ABSTRACT OF THE DISCLOSURE

The invention relates to the method of making dough products for refrigerated storage which retain their rounded shape on subsequent baking by forming a cereal dough, shaping the dough into individual units and rounding the dough, partially proofing the rounded dough in a humidified atmosphere at a suitable temperature and for a time sufficient to condition the dough to the spherical shape, again rounding the dough units and placing the units into a container for final proofing and subsequent refrigerated storage.

---

In commercial refrigerated dough practice, all ingredients are mixed, the resulting dough rolled out, the dough then sheeted and cut into blanks such as discs about 1½–2¼ inches in diameter by ¼–½-inch thick. The cutouts are dusted with rice, corn, or wheat flour or oiled to prevent sticking together and are then stacked and packed in a suitable can. These cans are dough-tight but not gas-tight. As a result, air and carbon dioxide may and do escape so that the dough reaches and blocks the gas outlets. Within about 1½–3 hours after the package is sealed, for instance, the rolls will have so expanded as to fill the container and close the original vents for gas and the internal pressure of carbon dioxide generated by the leavening materials will have risen to around 8–16 p.s.i. Pressure within the can will increase slightly over a period of 8 weeks or so if the biscuit dough and cans are normal and the storage temperature is between 40° and 50° F. All of the equipment including containers herein referred to are conventional and are not illustrated.

This pressure in the can closely packs and distorts the shape of the rolls. When removed from the can they will no longer bake into the typical rounded roll shapes desired. Moreover, existing procedures fail to provide products which, upon baking will have the crisper crusts conventionally associated with rolls purchased from bakeries.

It has now been found possible to prepare refrigerated roll doughs which can be packed in the usual manner in refrigerated dough cans, but which will maintain their capability of baking into typical roll shapes even after long storage while closely packed under pressure in distorted shapes in the cans.

Briefly stated, the present invention comprises the steps of rounding the dough, partially proofing the dough while rounded for a time sufficient to condition the dough, and then rounding the dough pieces a second time, prior to packaging and final proofing.

As to the ingredients, the flour, sugar, shortening, leavening ingredients, water, flavoring materials, and other minor ingredients, and the proportions thereof, are those conventionally used in making refrigerated laminated and non-laminated doughs. Typical examples are set forth in the examples herein, U.S. Patent No. 2,942,988, and the book entitled "Bakery Technology and Engineering" by Samuel Matz, published by AVI Publishing Company in 1961. More specifically, the instant invention will be described in connection with laminated roll dough which can contain, for each 1,000 parts by weight of flour, 10 to 200 parts sugar, 17 to 24 parts sodium bicarbonate, 22 to 40 parts sodium acid pyrophosphate, 10 to 35 parts salt, 10 to 110 parts non-fat milk solids, 10 to 100 parts shortening, 500 to 700 parts water, and 100 to 400 parts roll-in shortening.

The dough is prepared by combining all the ingredients, save for the roll-in shortening, to form a moderately extensible dough. The dough is formed into rectangular shape and sheets of roll-in shortening, such as margarine, are folded into the dough to yield a laminated structure, a dough-fat-dough-fat-dough assembly. This assemblage is reduced in thickness by repeated passes through a set of sheeting rolls set at a slightly narrower separation after each pass. When sufficiently thin the sheet is again folded over the center portion and passed through the sheeting rolls again. This sheeting operation may be repeated two or more times, but the final sheeting step results in a dough approximately three-quarters of an inch thick.

From this flat dough sheet pieces are cut and rounded into smooth surfaced balls which are then permitted to partially proof in a humidifier cabinet having a relative humidity of 80% to 100% and maintained at 80° to 110° F., until the dough is conditioned; normally about 5 to about 20 minutes. It can be determined that the dough balls are properly conditioned when they have expanded to about 1½ times their original diameter. In addition the balls should have a continuous surface, or "skin," which is smooth and elastic and which holds gas evolving in the interior. Under the above conditions the balls contain sufficient gas to give a somewhat soft or ballon-like feel when the piece is pressed between the fingers.

The dough pieces are put through a second and even third rounding step, or other size-reduction step of the same general type, but normally only two roundings are required. It is preferred to partially proof the rounded dough in a humidified atmosphere since this prevents drying of the surface of the dough ball with subsequent cracking and distortion. Also, a dough ball with a dry surface may not react propertly to a second rounding.

The pieces are then packed into a foil and fiber laminated can and proofed for three hours at 70° C. before being transferred into a refrigerated cooler and kept at 40° F. Refrigerated dough products are distributed and kept at refrigerated temperatures until consumed.

The rounding of the dough is accomplished in commercial operations by means of standard dough rounders well-known in the conventional bread baking art.

The invention will be further illustrated by the following examples, proportions here and elsewhere herein being expressed as parts by weight except where stated to the contrary.

EXAMPLE 1

A chemically leavened roll dough composed of the following ingredients was prepared.

|   | Grams |
|---|---|
| Hard wheat flour | 1000 |
| Sugar | 150 |

|                              | Grams |
|------------------------------|-------|
| Sodium bicarbonate           | 20    |
| Sodium acid pyrophosphate    | 35    |
| Salt                         | 25    |
| Milk solids not fat          | 60    |
| Shortening                   | 100   |
| Water                        | 600   |

This combination of ingredients was mixed in a vertical planetary mixer, equipped with a dough-hook to yield a moderately extensible dough.

The dough was formed manually into a rectangle about one-half inch thick and two sheets of puff-paste margarine about one-eighth inch thick and weighing a total of 200 grams were folded into the dough so as to yield a dough-fat-dough-fat-dough assemblage. This was reduced in thickness by repeated passes through a set of sheeting rolls set at slightly narrower separation after each pass. When sufficiently thin, one-third of this sheet was folded over the center portion of the sheet and the other end of the sheet was folded over the doubled portion to give three layers. The folded dough was reduced in thickness again. The folding and sheeting operation was repeated twice. The final sheeting step was discontinued when the dough was about three-fourths of an inch thick.

(a) A portion of the sheet was cut into square pieces weighing 42 grams and the pieces were rounded into smooth surfaced balls. After resting for 15 minutes in a humidified cabinet maintained at 80° F., the dough pieces were again rounded. Finally, the pieces were dusted with rice flour and packed six to a 1¾ x 7-inch can of fibre-foil laminate. The cans were held at 70° F. for three hours and then transferred to a 40° F. cooler where they were stored until required for testing.

(b) A second portion of the sheet was cut into squares and packaged as above. However, the pieces were not rounded or partially proofed as above. Instead the pieces were rolled in dusting flour just enough to give them an approximately spherical shape and were then canned.

(c) The remainder of the sheet was cut into circular pieces and canned as above without any rounding.

All the cans were stored under identical conditions for six weeks and then baked. The results are set forth in Table 1.

EXAMPLE 2

A second dough was prepared in exactly the same manner as that of Example 1, except that the puff-paste margarine was thrown into the mixer after the dough had been developed and mixing was resumed for three minutes at low speed. The resultant dough was laminated just as though the sheeted shortening had been applied as in the preceding preparation. After the final sheeting operation, square pieces (weighing about one-and-one-half ounces) were cut and rounded, proofed, and rounded a second time. The dough balls were packed as in the preceding cases.

After six weeks storage, the cans were opened and the contents baked. The results are set forth in Table 1.

(b) Parkerhouse rolls—Balls were flattened and elongated into thick oblongs without breaking the skin. A thin layer of margarine was spread on one half of the surface and the other half of the dough piece was folded over and pressed down on the adhesive margarine.

(c) Bread sticks—Balls were elongated to give cylinders approximately four inches long by rolling down in three stages separated by rest periods.

When baked after storage for six weeks, the rolls assumed regular, smooth, rounded contours. They had glossy and crisp crusts and uniform silky crumb.

While the exact theory is not understood it is believed that the rounding and shaping of the dough and partial proofing orients the gluten fibrils of the dough, especially in the surface layers, so that even after storage for long periods of time under pressure and being distorted the dough upon baking will assume the shape to which it has been conditioned. In brief, the invention provides the dough with a "memory" insuring proper shape upon baking.

It will be understood that it is intended to cover all changes and modifications of the examples of the invention herein chosen for the purpose of illustration which do not constitute departures from the spirit and scope of the invention.

What is claimed is:

1. The method of making roll dough products for refrigerated storage and subsequent baking whereby on baking the products will retain the typical rounded roll shape desired comprising the steps of forming a cereal dough, rounding individual units of the dough into a substantially spherical shape, partially proofing the rounded dough units in a humidified atmosphere at a suitable temperature until the dough units have expanded to about one-and-one-half times their original diameter, again rounding the dough units, and placing the units into a container for final proofing and subsequent refrigerated storage.

2. The method of making roll dough products for refrigerated storage and subsequent baking whereby on baking the products will retain the typical roll shape desired comprising the steps of forming a laminated cereal dough comprising layers of shortening interleaved between layers of dough, rounding individaul units of the dough into a substantially spherical shape, partially proofing the rounded dough units in a humidified atmosphere at a suitable temperature until the dough units have expanded to about one-and-one-half times their original diameter, again rounding the dough units, and placing the units into a container for final proofing and subsequent refrigerated storage.

3. The method of making roll dough products for refrigerated storage and subsequent baking comprising the steps of forming a laminated cereal dough comprising layers of shortening interleaved between layers of dough, dividing the dough into individual units, rounding the individual units into a substantially spherical shape, parti-

TABLE 1

| Type of dough | Shape | Crust appearance | Crumb texture | Taste |
|---|---|---|---|---|
| 1(a), rolled in shortening and double rounded. | Almost spherical | Glossy, flaky | Smooth, silky | Pleasant. |
| 1(b), rolled in shortening and briefly rounded. | Very irregular | Rough, broken | Coarse, uneven | Do. |
| 1(c), rolled in shortening and cut in discs. | Cylindrical, flat top | Irregular, dull | do | Do. |
| 2, shortening mixed in dough; rounded twice. | Squat spheroid | Smooth, dull | do | Greasy. |

EXAMPLE 3

In subsequent experiments, the following varieties of rolls were prepared, using as a basis the dough balls processed as in Example 1, but further shaped as set forth below just prior to canning.

(a) Cloverleaf rolls—Prepared by cutting three slits almost through a slightly flattened ball of dough and applying one gram of softened margarine in the cuts.

ally proofing the rounded dough units at a temperature of about 80° F. to about 110° F. in a humidified atmosphere having a relative humidity of about 80% to about 100% for about 5 to about 20 minutes until the dough units have expanded to about 1½ times their original diameter, and again rounding the dough units.

4. The method of making roll dough products for refrigerated storage and subsequent baking whereby on baking the products will retain the typical rounded roll shape desired comprising the steps of forming a cereal dough, dividing the dough into individual units, rounding the individual units into a substantially spherical shape, partially proofing the rounded dough units at a temperature of about 80° F. to about 110° F. in a humidified atmosphere having a relative humidity of about 80% to about 100% for about 5 to about 20 minutes until the dough units have expanded to about 1½ times their original diameter, and again rounding the dough units.

References Cited

UNITED STATES PATENTS

| | | |
|---|---|---|
| 2,478,618 | 8/1949 | Armstrong et al. |
| 2,942,988 | 6/1960 | Erekson et al. _____ 99—192 |
| 3,142,573 | 7/1964 | Erekson et al. _____ 99—90 |

RAYMOND N. JONES, *Primary Examiner.*

U.S. Cl. X.R.

99—90